United States Patent [19]

Fernschild et al.

[11] 4,005,176

[45] Jan. 25, 1977

[54] PROCESS FOR THE RECOVERY OF ANTIMONY PENTACHLORIDE FROM USED CATALYST SOLUTIONS

[75] Inventors: Günter Fernschild; Werner Rudolph; Joachim Massonne, all of Hannover, Germany

[73] Assignee: Kali-Chemie Aktiengesellschaft, Hannover, Germany

[22] Filed: Aug. 14, 1975

[21] Appl. No.: 604,540

[30] Foreign Application Priority Data

Aug. 17, 1974 Germany .......................... 2439540

[52] U.S. Cl. .................................. 423/87; 423/88; 423/491

[51] Int. Cl.² ............................................ C01B 9/00

[58] Field of Search .............. 423/87, 88, 466, 491; 252/415

[56] References Cited

UNITED STATES PATENTS

| | | | |
|---|---|---|---|
| 1,934,943 | 11/1933 | McNary | 423/466 |
| 1,984,480 | 12/1934 | Henne | 423/466 |
| 2,510,872 | 6/1950 | Downing | 423/88 |
| 3,369,862 | 2/1968 | Oelderik et al. | 423/87 |
| 3,784,671 | 1/1974 | Joerchel et al. | 423/88 |
| 3,806,589 | 8/1972 | Becher et al. | 423/88 |

*Primary Examiner*—Oscar R. Vertiz
*Assistant Examiner*—Wayne A. Langel
*Attorney, Agent, or Firm*—Bacon & Thomas

[57] ABSTRACT

Disclosed is a process for the recovery of antimony pentachloride from catalyst solutions used in the fluorination of chlorinated hydrocarbons characterized in that the exhausted catalyst solution containing antimony ions and high boiling halogenated hydrocarbons is chlorinated to convert the $Sb^{3+}$ to $Sb^{5+}$ followed by treatment of the solution with hydrogen fluoride to give $SbCl_xF_y$ compounds, wherein $x$ is 4–2 and $y$ is 1–3, the sum of $x+y$ being 5, and to convert the high boiling halogenated hydrocarbons to lower boiling halogenated hydrocarbons, thereafter removing the halogenated hydrocarbons having a lower boiling temperature than the boiling point of $SbCl_xF_y$ and converting the remaining $SbCl_xF_y$ compound with carbon tetrachloride to form antimony pentachloride which is thereafter separated from the remaining organic compounds and inorganic residue.

13 Claims, No Drawings

PROCESS FOR THE RECOVERY OF ANTIMONY PENTACHLORIDE FROM USED CATALYST SOLUTIONS

BACKGROUND OF THE INVENTION

The present invention relates to a process for the recovery of antimony pentachloride from exhausted catalyst solutions. More particularly, the process of the present invention yields antimony pentachloride from used catalyst solutions such as those employed in the fluorination of chloro-hydrocarbons.

It is known that many highly technical processes for the production of chloro-fluoro-hydrocarbons, especially chloro-fluoro-methane and chloro-fluoro-ethane, include reacting the chlorine containing starting compounds with hydrogen fluoride in the presence of antimony pentachloride catalysts to bring about the substitution of a portion of the chlorine on the hydrocarbon compound with fluorine. The compounds produced according to these technical processes have achieved great importance as solvents and coolants as well as being introduced as propellants in the aerosol industry. However, the methods for producing these important products require large amounts of expensive antimony pentachloride catalysts because the catalysts are used up in the process of fluorination of chloro-hydrocarbons.

The lifetime of the utilized catalyst solution is limited according to various circumstances. It is considerably dependent on external influences as for example on the purity of the raw products introduced or the kind of catalyst reaction. Because of the presence of impurities in the charged reaction components, high boiling organic compounds are often formed. These high boiling organic compounds can accumulate in the reaction system in large concentrations because their low vapor pressure, under the reaction conditions, permit only very slight quantities to be removed by distillation and thereby dilute the catalyst solution. Further, water can be introduced into the reaction system with the reaction components that are not absolutely water free. Subsequently, this can bring about a concentration of highly corrosive and only slightly decomposible antimony chloride-water complexes. Moreover, through corrosion of the apparatus and equipment parts, iron antimony complexes developed in the system which are not decomposible. The introduction of foreign material, whether of organic or inorganic nature, brings about a dilution and partial inactivation of the antimony pentachloride in the catalyst solution and correspondingly results in a diminishing rate of reaction and consequent loss of efficiency. Accordingly, the exhausted catalyst solution must be exchanged for chemically pure antimony pentachloride. The high price of reaquisition for antimony pentachloride and the extremely expensive disposal of used catalyst solutions make the recovery of antimony pentachloride extremely desirable.

Attempts at recovery of antimony pentachloride from used catalyst solutions through direct distillation have not been satisfactory, even with costly apparatus, because the high boiling organic compounds in the catalyst solution have boiling points which partially overlap with the narrow boiling range of antimony pentachoride. The consequent interference with the distillation of antimony pentachloride results in an ineffiecient, time-consuming operation.

According to other earlier known methods for the recovery of antimony pentachloride from used catalyst solutions, the antimony chloride salts present in the catalyst solution are converted into $SbCl_3$ and this is separated from the organic solution.

Such a procedure is described in German published application 2,056,648 wherein the used catalyst solution is heated under the addition of an equal volume of trichloro-ethylene in an autoclave at 100°–170° C followed by the separation of the crystaline antimony trichloride from the interferring contamination after cooling. A highly technical conducting of this method is not economical because this purification process must be carried out in an expensive pressure apparatus of nickle and because it utilizes great amounts of solvent. Further, complete recovery of the starting antimony is not possible in this procedure. The recovered $SbCl_3$ must be finally converted by way of chlorination into $SbCl_5$.

German published application 2,110,797, and its corresponding U.S. Pat. No. 3,784,671, propose the thermal dissociation of the $SbCl_5$ in the catalyst solution into $SbCl_3$ and $Cl_2$, extracting the organic contamination with haloginated hydrocarbons, subsequently oxidizing the $SbCl_3$ contained in the residue with chlorine to $SbCl_5$ and distilling off the recovered $SbCl_5$ in a vacuum from the inorganic impurities. This method also has the disadvantage of being uneconomical because, as the working example shows, comparatively high temperatures are necessaary to achieve the thermal decomposition of $SbCl_5$ to $SbCl_3$ and $Cl_2$. The procedure for carrying out this thermal reaction as well as the following chlorination of the $SbCl_3$ requires a pressure type apparatus of nickel alloy. The utilization of steel is not recommended for safety reasons of cause of the thermal stress in the presence of chlorine. At the high temperatures of the thermal decomposition, there exists a possibility that a portion of the $SbCl_3$ undergoing sublimation, as well as part of the high melting organic compounds, would be pulled out with the large amounts of chlorine escaping from the apparatus, resulting in the possibility of encountering dangerously high pressures because of a plugging of the chlorine gas escape passageway. Further, the separation of $SbCl_3$ from the organic impurities requires great amounts of carbon tetrachloride and other solvents as well as a large expenditure of time and energy. The corresponding separation in this process by way of recrystallization of the $SbCl_3$ has the disadvantage that it must be repeated several times to enable recovery of sufficient quantities of antimony trichloride. Because great quantities of dissolved $SbCl_3$ are separated also with the solvent, the $SbCl_3$ must be further recovered by distillation of the solvent from the organic extracts. A distillation recovery of the dissolved $SbCl_3$ from the combined solvents can only be successful with a very costly distillation apparatus because, for example, hexachloroethane boils only 35° C lower than antimony pentachloride, and tends to sublime at this temperature. Considering the required quantities of solvents utilized and the quantity of antimony trichloride recovered from this extraction material, this method is recognized to be uneconomical.

According to the method described in the German published application 2,140,188 and its corresponding U.S. Pat. No. 3,806,589, the used antimony halogen salt catalysts are separated through extraction with water from the halogenated hydrocarbons. For purification, the antimony chlorides are reduced, for example, with sulfur dioxide in the presence of alkali iodide to $SbCl_3$. For the removal of the heavy metal ions and the other foreign ions present, the $SbCl_3$ is converted with a concentrated ammoniacal solution into antimony trioxide. After reconversion of the filtered-off antimony oxides into $SbCl_3$, very pure $SbCl_3$ can be obtained through fractional distillation. According to this procedure, the reduction of $SbCl_5$ requires only a relatively modest expenditure with a low cost reduction material. The method, however, has the same disadvantage as in the previously discussed processes that generally a reduction of the $SbCl_5$ $SbCl_3$ must be performed in the process.

In the exhausted catalyst solutions the antimony exists for the most part in a form as active $SbCl_5$. The inactivity of the catalyst solutions rests, to a considerable measure, upon the dilution of the antimony pentachloride by high boiling organic compounds. The removal of the high boiling organic compounds from the $SbCl_5$ is extremely difficult to perform on an efficient economical basis. According to earlier known methods great quantities of $Sb^{5+}$ are converted into $Sb^{3+}$, which thereafter must be reoxidized.

There exists, therefore, a definite need to develop a process for the recovery of antimony pentachloride from used catalyst solutions in a simple economical, efficient method suitable to yield antimony pentachloride ready for use again as a catalyst.

SUMMARY OF THE INVENTION

It is therefore an object of the present invention to provide a process for the recovery of antimony pentachloride from used catalyst solutions.

A further object of the present invention resides in the efficient, economical recovery of antimony pentachloride from exhausted catalyst solutions.

It is also an object of the present invention to provide a process for the recovery of antimony pentachloride from used catalyst solutions which is industrially applicable with a minimum expenditure of energy and time.

It is likewise an object of the present invention to provide a process for the nearly complete recovery of antimony pentachloride from used catalyst solutions.

It is yet a further object of the present invention to provide a process for the recovery of antimony pentachloride from used catalyst solutions in the same apparatus in which the antimony pentachloride solutions are utilized as catalysts.

Yet a still further object of the invention resides in the provision of a process for the removal of antimony pentachloride from used catalyst solutions which requires and produces no material foreign to the ingredients, products and by-products of the process in which the antimony pentachloride catalyst are normally used.

Another object of the invention resides in the provision of a process for recovery of antimony pentachloride from used catalyst solutions wherein the antimony contained in the used catalyst solution remains in the form of $Sb^{5+}$ during the carrying out of the recovery process.

In accomplishing the foregoing and other objects, there is provided in accordance with the present invention, a process according to which a reduction of the antimony pentachloride to antimony trichloride is no longer necessary. The process for recovery of the antimony pentachloride from used catalyst solutions comprises (a) chlorinating the used catalyst solution containing $Sb^{3+}$ and high boiling organic compounds to convert said $Sb^{3+}$ to $Sb^{5+}$; (b) reacting the solution with hydrogen fluoride to give $SbCl_xF_y$ wherein $x$ is 4–2 and $y$ is 1–3, the sum of $x$ and $y$ being 5, and lower boiling organic compounds; (c) removing the lower boiling organic compounds having lower boiling temperatures than the $SbCl_xF_y$ compounds from the solution; (d) reacting the $SbCl_xF_y$ compounds with carbon tetrachloride to $SbCl_5$; and (e) separating the $SbCl_5$ from the solution. Typically, the treatment of the used catalyst solution with hydrogen fluoride is conducted at a temperature between about 20° to about 140° C and at a pressure of about 1 to about 6 atmospheres and preferably the temperature ranges from about 20° to about 100° C at pressures of about 1 to 4 atmospheres. Likewise, the removal of the lower boiling organic compounds is performed by vacuum distillation at temperatures of about 20° to about 100° C and pressures of about 20–100 Torrs, and preferably at temperatures of about 50° to 80° C and pressures of about 20–60 Torrs. Similarly, the reaction of the $SbCl_xF_y$ compounds with carbon tetrachloride to form antimony pentachloride is conducted at temperatures of about 50° to about 100° C and pressures of about 1–5 atmospheres and preferably temperatures of about 60° to 80° C and pressures of about 2–3 atmospheres. In the same manner removal step (e) is carried out by vacuum distillation at temperatures of about 50° C to about 80° C and pressures of about 30–60 Torrs.

In accordance with one aspect of the invention, the process is carried out by adding at the end of the distillation step (e) carbon tetrachloride and chlorine gas to convert $SbCl_3$ received by reduction in the destillation to $SbCl_5$.

There is also provided, in accordance with the invention, a process for recovery of substantially all the antimony from used catalyst solutions by treating the distillate resulting from step (c) with alkali hydroxide solution and recovering the precipitated alkali antimony from the distillate and additionally, including the steps of treating the distillation residue of step (e) with alkali hydroxide solution and recovering the precipitated alkali antimony from this final residue. In this manner, although nearly all the antimony pentachloride is recovered from the used catalyst solution, remaining amounts of antimony in the distillation residue and lower boiling organic compound distillate can additionally be recovered.

DETAILED DESCRIPTION OF THE PREFERRED EMBODIMENTS

In contradistinction to the prior art process, the process of the present invention makes possible the recovery of nearly all the antimony existing in exhausted catalyst solutions primarily in the form of active antimony pentachloride as well as minor amounts of antimony which can be easily converted to active antimony pentachloride. This nearly complete recovery can be accomplished without converting great quantities of $Sb^{5+}$ to $Sb^{3+}$ as is done in the earlier known methods. In spite of this nearly complete recovery of antimony, the process is simple and economical as a result of the primary process steps being conducted on the used catalyst solution containing the antimony pentachloride thereby allowing the removal of the interferring contaminants in the catalyst solution rather than the removal of the active antimony pentachloride. Further, the antimony pentachloride can be recovered by the process conditions which may take place in the same apparatus employed during the catalyzed fluorination of hydrocarbon in which the active antimony pentachloride is used. Likewise, the further advantage exists that no compounds foreign to the reactions and processes carried out in the apparatus are added in the process of the invention. Thus, the antimony pentachloride normally used as catalyst in the treatment of hydrocarbons, especially chloro and chloro-fluoro-hydrocarbons, to produce the well known fluorine containing hydrocarbons used as coolants, solvents and propellants is efficiently reactivated in the conventional apparatus of the processing plant where they are used.

The process of the present invention permits avoidance of the disadvantages of the previously known processes, particularly in the sense that the time and energy expenditures for recovery of the antimony pentachloride from used catalyst solutions is significantly decreased by treating the contaminated antimony in the solution to convert it to antimony pentachloride and by removing the organic contaminants from the active catalyst solution. This conversion of the antimony and removal of the contaminants is affected by the reaction of the used catalyst solution containing antimony ions and high boiling organic compounds with hydrogen fluoride to produce compounds of the type $SbCl_xF_y$ wherein $x$ is from 4–2 and $y$ is from 1–3, the sum of $x$ and $y$ being 5. These compounds are thereafter thermally stable and posses a different and higher boiling point than antimony pentachloride while the high boiling organic contaminants are converted to lower boiling organic compounds which may be removed by selective distillation of the solution. The further treatment with carbon tetrachloride of the $SbCl_xF_y$ compounds yields active antimony pentachloride directly with no further treatment or conversion being necessary permitting the immediate removal of pure activated antimony pentachloride suitable for direct use again as a catalyst.

Because a portion of the antimony pentachloride catalyst is converted to antimony trichloride during the use of the catalyst in conventional hydrocarbon fluorination reactions with antimony catalysts, usually present in an amount up to about 10% by weight, it is first chlorinated to antimony pentachloride in the untreated, used catalyst solution. The chlorination reaction at temperatures between about 20° to about 40° and at pressures from about 1 to 2.5 atmospheres converts substantially all the $Sb^{3+}$ to $Sb^{5+}$ in the solution. The total antimony pentachloride present in the catalyst solution can then be fluorinated by the addition of hydrogen fluoride at temperatures of about 20° C and normal pressure to give quantitative results. In general, the fluorination is carried out at temperatures between 20° and 140° C and pressures from about 1–6 atmospheres. Such treatment converts the antimony pentachloride to $SbCl_4F$, $SbCl_3F_2$ and in part, $SbCl_2F_3$.

Because these compounds exist in a general mixture, it is also possible that still higher fluorinated antimony compounds can be formed. Preferably, the fluorination is carried out at temperatures between 20° and 100° C and pressures of from 1–4 atmospheres. Accordingly, a transformation of $SbCl_5$ to $SbCl_4F$ and/or $SbCl_3F_2$ is desired.

One side reaction contemplated by the present invention is the fluorination of fluorine poor high boiling chloro-hydrocarbons, for example, $C_2Cl_6$ and $C_2FCl_5$, to lower boiling compounds. This occurs, of course, in the fluorination step designated step (b) while the $Sb^{5+}$ in the used catalyst solution treated with hydrogen fluoride to give the $SbCl_xF_y$ compounds. A continuing fluroination of the fluorine poor chloro-hydrocarbon with the simple carrying out of the process can be promoted by raising the temperature during the treatment with hydrogen fluoride slowly from room temperature to 60°–80° C. The hydrogen chloride developed with the fluorination is by way of example passed through an ascending cooler and a pressure release valve into a washing apparatus. The fluorination reaction is normally ended when the system's pressure decreases under the employed conditions because no more hydrogen chloride is formed or when the content of the chloride in the washer changes only to a negligible degree.

In the next step of the process of the invention, the selective removal of the interferring organic compounds is brought about by vacuum distillation at a temperature of about 20° to about 100° C and a pressure of about 20–100 Torrs. Preferably, the distillation is carried out between about 50° and 80° C and at a vacuum of from 20–60 Torrs. The distillation is continued until the quantity of the distilled organic product clearly decreases under the distillation conditions, what in general can be recognized as a decline in head temperature. In this manner the predominant part of the organic constituents are separated from the solution. The collected organic products contain fewer than 2% of the dissolved antimony. This minor amount of antimony can, nevertheless, be recovered by precipitation with alkali hydroxide solution in the form of alkali antimonate. Thus, little, if any, valuable antimony is lost in the distillate.

After the above distillation step, the distillation residue exists predominantly in the form of compounds $SbCl_4F$ and $SbCl_3F_2$ as well as iron-antimony complexes, antimony water complexes and high boiling halogenated derivatives and hydrocarbons with more than 2 carbon atoms and also as tar-like products. To this distillation residue remaining from the original catalyst solution, the recovery of antimony pentachloride is achieved by treatment with carbon tetrachloride at the temperatures between about 50° and 120° C and pressures of about 1 to about 5 atmospheres. Preferably this reaction is carried out at a temperature of about 60° to about 80° C and a pressure of about 2–3 atmospheres.

In addition to the formation of antimony pentachloride in this step, the low boiling organic compounds $CFCl_3$ and $CF_2Cl_2$ are formed with this reaction from the carbon tetrachloride by way of fluorination. These compounds are continuously removed and collected. Likewise, the antimony-water complexes contained in the residue are converted into antimony pentachloride with this reaction. Accordingly, the portion of recovered antimony pentachloride is increased substantially by carrying out the carbon tetrachloride treatment on the full solution remaining after the first distillation step.

The excess carbon tetrachloride, as well as the chloro-fluoro-carbons still present in small quantities, are obtained at the initial running of the antimony pentachloride distillation. The antimony pentachloride is distilled off under vacuum distillation of about 20 to about 60 Torrs and at a temperature of between about 50° and 80° C. It has also been demonstrated as highly advantageous to treat the solution undergoing distillation with carbon tetrachloride and chlorine in order to convert the antimony trichloride still remaining in the solution to antimony pentachloride. Thereafter, the distillation is continued until no more antimony pentachloride can be distilled off.

Throughout the process of the present invention, the addition of various reactants and agents such as, for instance, chlorine gas, hydrogen fluoride, carbon tetrachloride, alkali hydroxide and the like may be accomplished by any known means suitable under the conditions of the various process steps. Conditions such as temperature and pressure may be varied within the preferred limitations and ranges given to achieve optimum results and most efficient and economical operation of the present invention. The amounts of the used catalyst solution subjected to the process conditions as well as the amounts of additional reactants, agents and the like, are determined by the size of the reaction apparatus and conditions under which the process is carried out, as well as on the degree of completion of the reaction or treating step desired. It may generally be said that the chlorinating step (a) is best achieved by adding an effective amount of chlorine to the used catalyst solution to convert the $Sb^{3+}$ to $Sb^{5+}$. Similarly, an effective amount of hydrogen fluoride is added in step (b) to yield $SbCl_xF_y$ and lower boiling organic compounds in sufficient quantities so that the distillation procedure of step (c) removes a quantity of lower boiling organic compounds sufficient to prevent further contamination and interference with the remaining process steps. Carbon tetrachloride is added in step (d) in amounts effective in reacting $SbCl_xF_y$ to $SbCl_5$.

For the recovery of antimony from the distillate of step (c), the conventional addition of effective amounts of alkali hydroxide solution to produce a precipitated alkali antimonate is required. Likewise, treatment of the distillation residue from step (e) is affected by the conversion of antimony present therein to alkali antimonate after treatment with effective quantities of alkali hydroxide under standard conditions.

The antimony pentachloride acquired in this manner is clear, transparent and from light to middle brown in color. This solution contains 92 to 97 weight percent antimony pentachloride.

85–90% of the total antimony content originally in the catalyst solution is recovered. The remaining 3–5% of the distillate consist substantially of carbon tetrachloride. The solution thus obtained can be employed without further treatment as active catalyst in conventional production methods. Accordingly, as opposed to previously known methods, the antimony is fully ready to be used as a catalyst, i.e., active antimony pentachloride, immediately upon its first separation from the exhausted catalyst solution. No further oxidation or reduction or treatment of any kind is required before reemployment of the antimony catalyst in production.

The tar-like distillation residue remaining after distilling off the antimony pentachloride is present primarily as halogenated hydrocarbons with more than two carbon atoms and also as the stable iron-antimony complex. These products, moreover, include lubrication residue and tar-like decomposition products. Any antimony remaining in this residue can be isolated in the form of alkali antimonate by after-treatment with alkali hydroxide solution. In this manner, the originally present antimony in the exhausted catalyst solution can be nearly fully recovered.

The industrial efficiency of the process according to the present invention is also shown from the fact that the carrying out of the process can be performed in the same apparatus and equipment as that already used at the production location as for example in the treatment of chloro-hydrocarbons with fluorine in the presence of catalyst to produce fluoro-carbons. The used catalyst solution can be treated up to the vacuum distillation step yielding pure antimony pentachloride in the production reactor and can be distilled off from this reactor in a standard condenser. All necessary temperatures and pressures of the process are adjusted within the framework of requirements as already measured by the production processes.

A special advantage of the process is that the antimony portion contained in the used catalyst solution remains during the carrying out of the total process in the five-step oxidation period. Accordingly, the conversion of $Sb^{3+}$ to $Sb^{5+}$ is by chlorination, thus introducing no foreign gases to the system. Further, the added chemicals, hydrogen fluoride and carbon tetrachloride, in the carrying out of the process according to the present invention are customary ingredients for the manufacture of the corresponding chloro-fluoro-hydrocarbons.

In the end these added chemicals or treating agents can be recovered after reacting them in a conventional purification operation as chloro-fluoro-methane. Accordingly, the process achieves excellent results as it can be carried out under mild reaction conditions requiring only a modest usage of material, time and energy.

These features and other characteristics of the process of the present invention will be apparent from the following examples which are given by way of illustration and without limitation. All percentages given hereinafter are weight percentages unless designated otherwise.

EXAMPLE 1

An exhausted catalyst solution in the amount of 6,950 g. containing 30.3% antimony (of which 2% is $Sb^{3+}$), 0.4% iron and 28.3% organic compounds is charged into a 5 liter reaction flask with a double steel jacket. The reaction flask is outfitted with a stirrer and an ascending cooler, a dip tube or emersion tube for the addition of chlorine and hydrogen fluoride, a floor pressure valve, a pressure vacuum meter and a temperature measuring position.

In the first step of the method the $Sb^{3+}$ contained in the catalyst solution is chlorinated to $Sb^{5+}$ by passing 85 g. of $Cl_2$ through the catalyst solution. During this, the catalyst solution is intensively stirred as is also done in the following process steps. In the second step, at a pressure of about 3 atmospheres, 480 g. of hydrogen fluoride is added. The reaction temperature is raised during the feeding of the hydrogen fluoride from 20° to 60° C. Thus the antimony pentachloride is reacted to $SbCl_4F$ and in a small part to $SbCl_3F_2$. The high boiling organic compounds are fluorinated to lower boiling compounds. The quantity of hydrogen chloride given off during the fluorination reaction and collected in the wash water at the end of the reaction measures 910 g. In the third step of the process, the organic compounds which can be separated are distilled from the reaction flask to a distillation condenser passing an ascending cooler. In this manner a total of 1,441 g. of distillate are collected at a vacuum of 34 Torrs and at a maximum head temperature of 67° C until the temperature decreased. A portion of the distillate is condensed in two condensers cooled to -50° C which are situated between the distillation condenser and the water stream pump. The received distillate comprises 92% organic and 8% inorganic components. 67.2% of the organic components of the original amount of the catalyst solution are separated together with 2.2% antimony in this step. In the fourth process step, the remaining distillation residue in the distillation vessel is treated with 3.2 kg carbon tetrachloride at 75° C and 2.5 atmospheres for three hours. The antimony chloro-fluoro-compounds are converted to antimony pentachloride, thereby 352 liters of a gas mixture containing approximately 70% by volume $CF_2Cl_2$ and 30% by volume $CFCl_3$ are obtained.

Before the distillation of antimony pentachloride eight hundred ninety-five (895) grams of a mixture containing approximately 55% unreacted carbon tetrachloride and 45% $CFCl_3$ are distilled off at a temperature of 80° and a pressure of 600 Torrs.

In the next and fifth step the main quantity of antimony pentachloride is distilled off at a vacuum of 40 Torrs and a maximum head temperature of 70° C. For reaction of the antimony trichloride component remaining in the distillation solution, the distillation is broken off shortly and after the addition of 100 g. carbon tetrachloride as solvent the antimony trichloride is reacted with 45 g. chlorine to antimony pentachloride. Finally, the distillation is continued with the heretofore mentioned conditions until no more antimony pentachloride is given off. Antimony pentachloride solution in the amount of 4,630 g. is collected in the distillation condenser. This solution contains 4,525 g. antimony pentachloride or 97.7% antimony pentachloride and 2.3% of a mixture of carbon tetrachloride and organic compounds from the catalyst solution. A percentage of 87.5% of antimony pentachloride relating to the quantity of antimony in the used catalyst solution can thereby be recovered.

The residue in the reaction flask measures 847 g. It still contains 217.3 g. antimony as 10.3% antimony in the form of iron- and organic complexes. Thus 10.3% of antimony is precipitated with a caustic potash solution as crystaline compounds and separated from the remaining components.

The recovered material from the completed process of the invention amounts to 87.5% by weight of the original antimony as antimony pentachloride with a purity of 97.7%. Inclusively, the recoverable quantity of antimony from the residue measures a yield of antimony pentachloride of 96.3% with an almost full separation of organic impurities and iron compounds.

What is claimed is:

1. A process for the recovery of antimony pentachloride from used catalyst solution comprising:

a. chlorinating used catalyst solution containing $Sb^{3+}$ and high boiling halogen-containing hydrocarbons to convert said $Sb^{3+}$ to $Sb^{5+}$;
   b. reacting said solution with hydrogen fluoride to give $SbCl_xF_y$ wherein $x$ is 4–2 and $y$ is 1–3, the sum of $x$ and $y$ being 5, and fluorinated lower boiling hydrocarbons;
   c. removing said fluorinated lower boiling hydrocarbons having lower boiling temperatures than said $SbCl_xF_y$ compounds from said solution by distillation;
   d. reacting said $SbCl_xF_y$ compounds with carbon tetrachloride to $SbCl_5$; and
   e. separating said $SbCl_5$ from said solution by distillation.

2. The process as defined by claim 1 wherein chlorinating step (a) is carried out at temperatures of about 20°–40° C and pressures of about 1–2.5 atmospheres.

3. The process as defined by claim 1 wherein step (b) is carried out at temperatures of about 20°–140° C and pressures of about 1–6 atmospheres.

4. The process as defined by claim 1 wherein step (b) is carried out at temperatures of about 20°–100° C and pressures of about 1–4 atmospheres.

5. The process as defined by claim 3 wherein said reaction with hydrogen fluoride is carried out first at a temperature of about 20° C then slowly raised to about 60°–80° C.

6. The process as defined by claim 1 wherein step (c) is carried out by vacuum distillation at temperatures of about 20°–100° C and pressures of about 20–100 Torr.

7. The process as defined by claim 1 wherein step (c) is carried out by vacuum distillation at temperatures of about 50°–80° C and pressures of about 20–60 Torrs.

8. The process as defined by claim 1 wherein reacting step (d) is carried out at temperatures of about 50°–120° C and pressures of about 1–5 atmospheres.

9. The process as defined by claim 1 wherein reacting step (d) is carried out at temperatures of about 60°–80° C and pressures of about 2–3 atmospheres.

10. The process as defined by claim 1 wherein separating step (e) is carried out by vacuum distillation at temperatures of about 50°–80° C and pressures of about 20–60 Torrs.

11. The process as defined by claim 1 further comprising adding at the end of the distillation of step (e) $CCl_4$ and $Cl_2$ to convert $SbCl_3$ received by reduction in the distillation to $SbCl_5$.

12. The process as defined by claim 1 further comprising treatment of the distillate resulting from step (c) with alkali hydroxide solution and recovery of precipitated alkali antimonate from said distillate.

13. The process as defined by claim 1 further comprising:
   f. treating the distillation residue of step (e) with alkali hydroxide solution, and
   g. recovering the precipitated alkali antimonate.

* * * * *